United States Patent
Elie et al.

(10) Patent No.: US 9,746,133 B2
(45) Date of Patent: Aug. 29, 2017

(54) HYDROGEN STORAGE TANK COMPRISING METAL HYDRIDES PRODUCED THROUGH SIMPLIFIED MANUFACTURE AND STORAGE DEVICE COMPRISING AT LEAST SUCH A TANK

(71) Applicant: Commissariat a l'energie atomique et aux energies alternatives, Paris (FR)

(72) Inventors: Manon Elie, Grenoble (FR); Albin Chaise, Grenoble (FR); Olivier Gillia, Sassenage (FR); Michel Planque, Seyssins (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 257 days.

(21) Appl. No.: 14/433,492

(22) PCT Filed: Oct. 1, 2013

(86) PCT No.: PCT/EP2013/070465
§ 371 (c)(1),
(2) Date: Apr. 3, 2015

(87) PCT Pub. No.: WO2014/053497
PCT Pub. Date: Apr. 10, 2014

(65) Prior Publication Data
US 2015/0260342 A1    Sep. 17, 2015

(30) Foreign Application Priority Data
Oct. 4, 2012 (FR) .................................. 12 02650

(51) Int. Cl.
*B65D 85/00*    (2006.01)
*F17C 11/00*    (2006.01)
*F17C 1/12*    (2006.01)

(52) U.S. Cl.
CPC .............. *F17C 11/005* (2013.01); *F17C 1/12* (2013.01); *F17C 2203/0362* (2013.01);
(Continued)

(58) Field of Classification Search
USPC ...................................................... 206/0.6, 0.7
See application file for complete search history.

(56) References Cited

U.S. PATENT DOCUMENTS

| 4,446,111 A | 5/1984 | Halene et al. |
| 4,667,815 A | 5/1987 | Halene |

(Continued)

FOREIGN PATENT DOCUMENTS

| EP | 1 454 876 | 9/2004 |
| EP | 2 492 575 | 8/2012 |

(Continued)

OTHER PUBLICATIONS

International Search Report Issued Dec. 17, 2013 in PCT/EP13/070465 Filed Oct. 1, 2013.
(Continued)

*Primary Examiner* — Jacob K Ackun
(74) *Attorney, Agent, or Firm* — Oblon, McClelland, Maier & Neustadt, L.L.P.

(57) ABSTRACT

A hydrogen storage material tank including a shell along a longitudinal axis, a hydrogen supply and collection duct along a longitudinal axis, a stack of plural cups around the duct, wherein each cup includes a base perpendicular to the longitudinal axis, a passage allowing installation of the cup around the duct, an outer wall perpendicular to the base, in contact with the shell and an inner wall perpendicular to the base and in contact with the duct, wherein each cup is force-fitted on the duct and each cup includes a mechanism
(Continued)

allowing mutual engagement of the cups in one another by mechanical deformation of free ends of the outer walls of the cups.

13 Claims, 4 Drawing Sheets

(52) U.S. Cl.
CPC ......... *F17C 2209/22* (2013.01); *Y02E 60/321* (2013.01); *Y02E 60/324* (2013.01); *Y10T 29/49908* (2015.01)

(56) References Cited

U.S. PATENT DOCUMENTS

| | | | |
|---|---|---|---|
| 6,722,154 B1 | 4/2004 | Tan et al. | |
| 6,991,770 B2 | 1/2006 | Suzuki et al. | |
| 8,985,319 B2 | 3/2015 | Chaise et al. | |
| 2004/0178083 A1 | 9/2004 | Yang et al. | |
| 2005/0211573 A1* | 9/2005 | Myasnikov | C01B 3/0005 |
| | | | 206/0.7 |
| 2011/0138748 A1 | 6/2011 | Olivier et al. | |
| 2011/0192732 A1* | 8/2011 | Lin | F17C 11/005 |
| | | | 206/0.6 |
| 2011/0262638 A1 | 10/2011 | Gillia et al. | |
| 2012/0160712 A1 | 6/2012 | Yang et al. | |
| 2012/0211376 A1* | 8/2012 | Chung | F17C 11/005 |
| | | | 206/0.7 |
| 2012/0222971 A1 | 9/2012 | Gillia et al. | |
| 2013/0228476 A1* | 9/2013 | Gregg | C23C 16/4481 |
| | | | 206/0.6 |
| 2014/0061066 A1* | 3/2014 | Chung | F17C 1/12 |
| | | | 206/0.6 |
| 2014/0116874 A1 | 5/2014 | Planque | |

FOREIGN PATENT DOCUMENTS

| | | |
|---|---|---|
| GB | 1 531 862 | 11/1978 |
| GB | 2 122 330 | 1/1984 |
| JP | 9 236199 | 9/1997 |

OTHER PUBLICATIONS

French Search Report Issued Aug. 5, 2013 in Application No. FR 1202650 Filed Oct. 4, 2012.

* cited by examiner

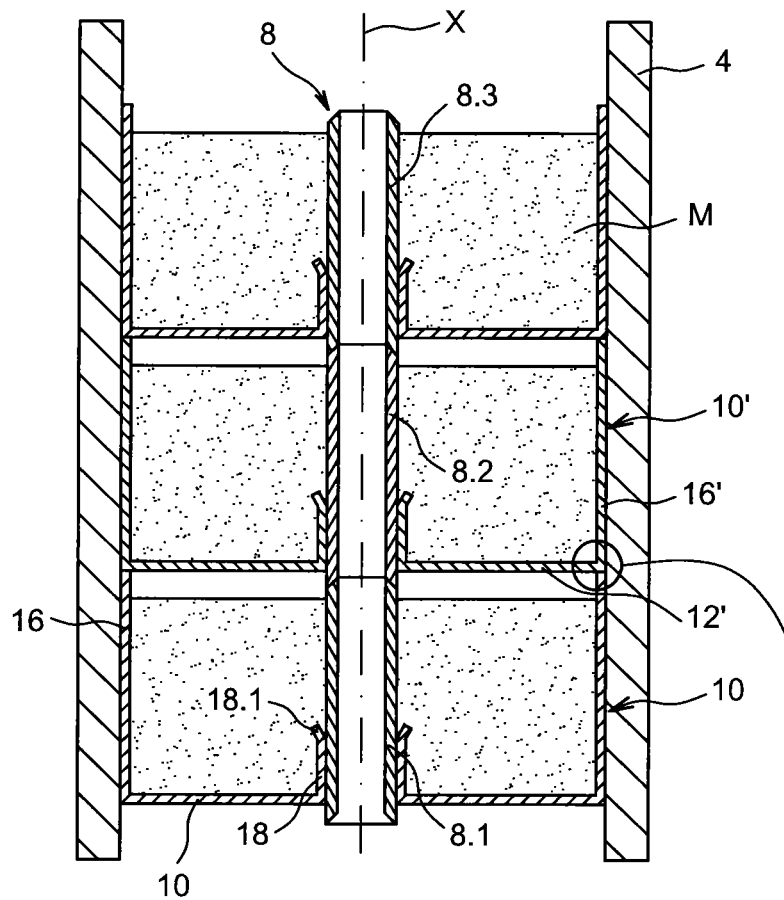
FIG. 2
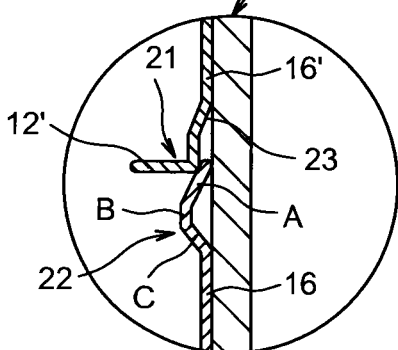

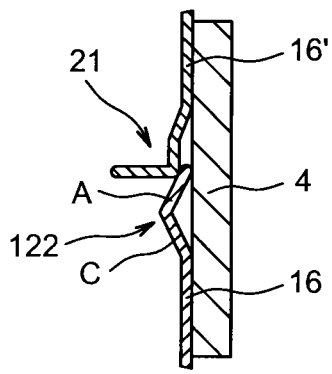
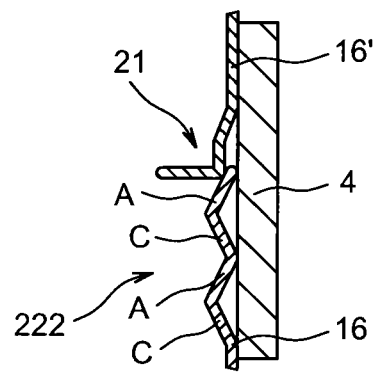
FIG. 3A   FIG. 3B
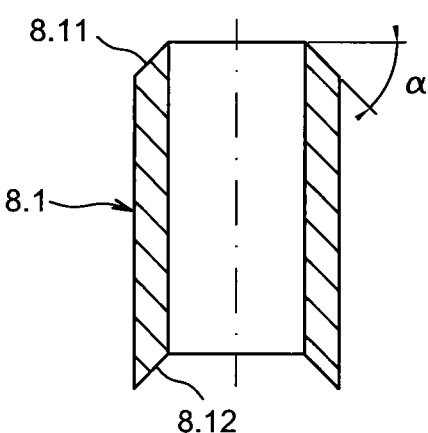
FIG. 4

HYDROGEN STORAGE TANK COMPRISING METAL HYDRIDES PRODUCED THROUGH SIMPLIFIED MANUFACTURE AND STORAGE DEVICE COMPRISING AT LEAST SUCH A TANK

TECHNICAL FIELD AND PRIOR ART

The present invention concerns a hydrogen storage tank comprising metal hydrides and a hydrogen storage device comprising at least such a tank.

Alternative energies to replace petroleum are being sought owing in particular to the reduction in petroleum reserves. Hydrogen represents one of the promising vectors for these energy sources and can be used in fuel cells to produce electricity.

Hydrogen is an element that is found ubiquitously in the universe and on Earth; it can be produced from natural gas or other hydrocarbons, but also by simple electrolysis of water using electricity produced by solar or wind power.

Hydrogen fuel cells are already used in certain applications, in motor vehicles for example, but are still uncommon, particularly owing to the precautions to be taken and the difficulties in storing hydrogen.

Hydrogen can be stored in compressed form at between 350 and 700 bars, which raises safety problems. Provision must be made in this case for tanks capable of withstanding these pressures, in the knowledge however that these tanks, when mounted on vehicles, may be subject to impacts.

It may be stored in liquid form; yet this storage only provides limited storage performance and does not allow storage over long periods.

Transformation of a volume of hydrogen from a liquid state to a gaseous state under normal conditions of pressure and temperature results in an increase in its volume by a factor of approx. 800. Tanks containing hydrogen in liquid form are generally not very resistant to mechanical impacts, which raises significant safety issues.

Storage of so-called "solid" hydrogen in the form of hydride also exists. This type of storage allows a high volumetric storage density and employs a moderate hydrogen pressure while minimising the energy impact of the storage on the overall performance of the hydrogen chain, i.e. from its production to its conversion into another energy.

The principle of solid storage of hydrogen in the form of hydride is as follows: some materials and in particular some metals are capable of absorbing hydrogen, forming a hydride; this reaction is known as absorption. The hydride formed is in turn capable of yielding gaseous hydrogen and a metal. This reaction is known as desorption. Absorption or desorption occur as a function of the partial hydrogen pressure and the temperature.

The absorption and desorption of hydrogen on a powder or a metal matrix M occur according to the following reaction:

where M is the powder or metal matrix,
MHx is the metal hydride.

A metal powder for instance is used, which is placed in contact with hydrogen; an absorption phenomenon appears and a metal hydride is formed. Hydrogen release occurs by means of a desorption mechanism.

Hydrogen storage is an exothermic reaction, i.e. that releases heat, whereas hydrogen release is an endothermic reaction, i.e. that absorbs heat.

It is sought in particular to obtain rapid charging of the metal powder with hydrogen. In order to obtain said rapid charging, the heat generated during this charging must be evacuated in order to avoid retarding hydrogen absorption on the powder or the metal matrix. Heat is supplied during hydrogen discharging. Consequently, the efficacy of cooling and heating, i.e. the quality of the thermal exchanges governs the charging and discharging flow rates.

Furthermore, almost systematically, the hydride and the metal, which both exist in powder form in the tanks, have a difference in density included between 10% and 30%.

This variation in density within the tank has two consequences:
- on the one hand, the emergence of stresses within the powder particles during the absorption-desorption cycles, which causes their splitting into smaller particles. This phenomenon is known as decrepitation;
- on the other hand, swelling of the powder particles during hydrogen absorption and shrinkage of the particles during desorption. A free volume above the powder is provided in this case to cater for this swelling.

The decrepitation phenomenon and the swelling phenomenon result in gradual densification of the bed of powder as the number of absorption-desorption cycles increases. Indeed, decrepitation causes emergence of increasingly fine powders that migrate by gravity towards the floor of the tank through the network of particles. In addition, when the velocity of the hydrogen flow is sufficiently high, the particles are displaced and rearranged in the tank. Furthermore, the bed of powder tends to retract, i.e. undergo a reduction in its volume during a desorption process, leaving an empty space between the walls of the tank and the bed of the hydrogen storage material.

A migration of the powders occurs by gravity through this space, filling the latter. During the next absorption process, the hydride powder formed will not behave as a fluid. In particular, the level of the bed of powder in the tank is not that achieved during the preceding absorption. Indeed, the frictions of the particles among one another and against the tank wall prevent the bed of powder from expanding freely. Swelling of the powder particles is compensated in this case by the reduction in the size of the porosities.

The bed of hydrogen storage material/hydride thus densifies gradually during the hydriding cycles.

An absorption phase followed by a hydrogen desorption phase is called a "hydriding cycle".

It is therefore important to avoid accumulation of hydrogen storage material in a deep confined space that might apply stresses capable of damaging the tank structure.

It has been suggested compartmentalising the quantity of storage material employed in order to reduce the problems associated with accumulation and swelling of the storage material. Tanks in which the storage material is distributed over different levels have been proposed for this purpose. The tank comprises a cylindrical shell through which a porous tube passes longitudinally for distribution and collection of hydrogen and cups installed around the porous tube and delimiting the levels. If the cups fail to delimit the sealed chambers, the powdered material, during decrepitation, is able to pass between the cylindrical shell and the cup and/or between the cup and the porous tube. The material accumulates in the lower levels and in the floor of the tank.

In order to avoid this accumulation, document EP 1 454 876 proposes a tank comprising several superimposed cups, with each cup being formed of a flat base provided with a central passage for hydrogen supply and collection, a radially outer peripheral edge and if the tank is loaded with a material in powder or granule form, with a radially interior peripheral edge bordering the central passage. The cups are welded to one another on the radially interior peripheral edge and on their radially outer peripheral edge so as to form sealed compartments. The powder is thus no longer able to escape from its compartment and accumulate in an area below.

Firstly, this device is highly rigid and may be weakened in case of thermal expansion Secondly, it poses difficulties in filling and in its installation, particularly when assembled and filled in a glove box. In addition, it cannot be easily dismantled.

INVENTION DISCLOSURE

Consequently, an aim of the present invention is to offer a hydrogen storage device of simple and robust design offering effective confinement of the hydrogen storage material.

The aforementioned aim is achieved by a storage material tank comprising a cylindrical shell sealed at its longitudinal ends, at least one longitudinal hydrogen supply and collection duct, several superimposed cups comprising a base, an outer peripheral wall, an inner peripheral wall, whereby said cups are force-fitted around the longitudinal hydrogen supply and collection duct and are in contact by their outer peripheral wall. The longitudinal ends of the outer peripheral walls are configured such that the lower longitudinal end of a cup located above fits within the cup located directly underneath, causing at least partially elastic deformation of the bottom cup.

Hence, each cup delimits with the one immediately above it in a simple and lasting manner a sealed compartment for the storage material. Indeed, employing an at least partially elastic connection makes it possible to avoid a hyperstatic structure and therefore guarantee effective sealing both between the longitudinal hydrogen supply and collection duct and the central portion of the cups and at the outer periphery of the cups. Moreover, the latter is more capable of withstanding the stresses due to the thermal expansions.

The assembly is in addition very simple, since it is performed by simple mutual engagement; no welding or complex means of assembly is used. The tank can then be easily assembled in a glove box.

In other words, the tank or tanks comprise stacked cups, with the top cup forming a sealed closing cap for the cup underneath through interaction by at least partial plastic deformation between the two cups.

In one advantageous embodiment, the longitudinal duct is formed of several duct portions capable of mutual engagement with one another so as to form the duct. Prior to assembly each duct portion is force-fitted in a cup, thereby forming subassemblies. One subsequently performs, simultaneously with mutual engagement of the cup with the cup located underneath, mutual engagement of the portion of the top duct with the portion of duct underneath.

In one example of embodiment, the hydrogen storage device comprises an enclosure and one or several tanks forming a forest arranged in the enclosure and the tank is filled with a circulating heat transfer fluid forming the thermal exchange system.

In another example of embodiment, the thermal exchange system is formed either of a jacket surrounding the tank and in which a heat transfer fluid circulates or of a coil surrounding the tank.

The subject-matter of the present invention is therefore a hydrogen storage material tank for a device for hydrogen storage by absorption in a hydrogen storage material, comprising a shell along a longitudinal axis sealed at both its longitudinal ends, a hydrogen supply and collection duct extending along the longitudinal axis, a stack of several cups along the longitudinal axis, wherein each cup comprises a base approximatively perpendicular to the longitudinal axis, a passage allowing installation of the cup around the duct, an outer wall perpendicular to the base, in contact with the shell and an inner wall perpendicular to the base and in contact with the duct, wherein the outer wall has a dimension along the longitudinal axis greater than that of the inner wall such that its free end is in contact with the base of the cup located above in the stack, wherein each cup is press-fitted on the duct and each cup comprises means allowing mutual engagement of the cups in one another by mechanical deformation of said free ends of the outer walls of the cups.

Advantageously, the means allowing mutual engagement of the cups in one another by mechanical deformation are formed by a deformable area of the outer walls located at the free ends and having portions angled in relation to the longitudinal axis.

Each deformable area may comprise, on the free end side of the outer wall, a portion angled away from the longitudinal axis so as to display a flared shape facilitating mutual engagement of the base of the cup located above in the stack and at least one portion angled towards the longitudinal axis (X) and wherein each base of a cup has a diameter smaller than the largest internal diameter of the outer wall of said cup.

The duct is for example formed of several duct portions superimposed along the longitudinal axis. Each duct portion may advantageously comprise on its longitudinal ends means of guiding positioning of the duct portions in relation to one another.

Each duct portion may in this case have a male connection end and a female connection end such that the duct portions are connected to one another. Advantageously, the male and female connection ends are conical in shape, with a vertex angle less than or equal to 45°.

The cups are preferably executed in a material with good thermal conductivity.

The duct is advantageously made of porous material impervious to the powder and allowing hydrogen to pass through.

Preferably, the inner wall of each cup comprises a flared free end.

The tank may comprise clamping means exerting a clamping force along the longitudinal axis between the cups located at the longitudinal ends of the stack. The clamping means may comprise a longitudinal element installed in the duct, a support piece abutting against the base of one of the end cups and a clamping nut screwed on the longitudinal element and resting on the free end of the inner wall of the cup located at the other longitudinal end.

Another subject-matter of the present invention is an assembly of a tank according to the present invention and a hydrogen storage material arranged in each of the cups, the storage material in powder form preferably represents between 40% and 60% of the volume of the cup.

Another subject-matter of the present invention is a device for hydrogen storage by absorption in a hydrogen storage material, comprising at least one storage tank according to the present invention or an assembly according to the present invention, a hydrogen supply and collection system connected to the duct of said at least one tank and thermal exchange means capable of ensuring thermal exchange with the storage material intended to be arranged in the tank or which is arranged in the tank.

The hydrogen storage device may comprise an enclosure in which said at least one tank is arranged and the thermal exchange means comprise means of supply and discharge of a thermal exchange fluid within the enclosure capable of generating fluid circulation within the enclosure in order to contribute or extract heat.

The hydrogen storage device preferably comprises several tanks.

In one example of embodiment, the tank is surrounded by a jacket delimiting a channel with the tank shell and the thermal exchange means ensure circulation of heat transfer fluid in said channel.

In another example of embodiment, the hydrogen storage device comprises a coiled tube surrounding the tank and the thermal exchange means ensure circulation of the heat transfer fluid in said coiled tube.

In another example of embodiment, the hydrogen storage device comprises several tanks and the longitudinal axes of the tanks are approximatively parallel, with the heat transfer fluid circulating between the tanks.

Another subject-matter of the present invention is a manufacturing process of an assembly according to the present invention comprises the stages of:

a) placement of the hydrogen storage material in a first cup, b) insertion of the first cup in the shell, c) introduction of the hydrogen storage material into a second cup, d) mounting of the second cup on the first cup by engaging the base of the second cup in the first cup so as to deform elastically the free end of the outer wall of the first cup, e) repetition of stages c) and d) depending on the desired number of compartments, f) closing of the shell, wherein the duct is installed prior to assembly of the cups or as work progresses, with the cups being force-fitted on said duct.

Prior to stage a), subassemblies formed of a cup and a duct portion may be assembled, wherein a duct portion is force-fitted in the central passage of a cup.

The hydrogen storage material is preferably in the form of a solid block at the time of its introduction, with a shape corresponding to the internal shape of the cup.

The manufacturing process of a storage device according to the present invention may comprise the stages of the process according to the present invention and the stages of connection to the hydrogen supply and collection systems and of assembly with a thermal exchange system.

BRIEF DESCRIPTION OF THE DRAWINGS

The present invention will be better understood with the aid of the description to be given below and the appended drawings on which:

FIG. 2 is an enlarged view of FIG. 1, FIGS. 3A and 3B are detailed views of FIG. 1 according to different variants of embodiment, FIG. 4 is a view in longitudinal cross-section of portions of hydrogen supply and collection duct according to an example of embodiment capable of being employed in the storage device according to the invention.

DETAILED DISCLOSURE OF PARTICULAR EMBODIMENTS

Metal hydrides will be denoted by "storage material" in the further description.

In the description that follows, the tank(s) described above display a circular cylindrical shape, which represents the preferred embodiment.

Nevertheless, any tank formed by a hollow element having a longitudinal dimension greater than its crossways dimension and possessing a section of any kind, for example circular or polygonal or elliptical, does not go outside the scope of the present invention.

A hydrogen storage device according to the invention comprises one or several tanks containing storage material and a thermal management system designed to contribute and extract heat to release hydrogen and store the latter in the storage material respectively.

Figure 5:
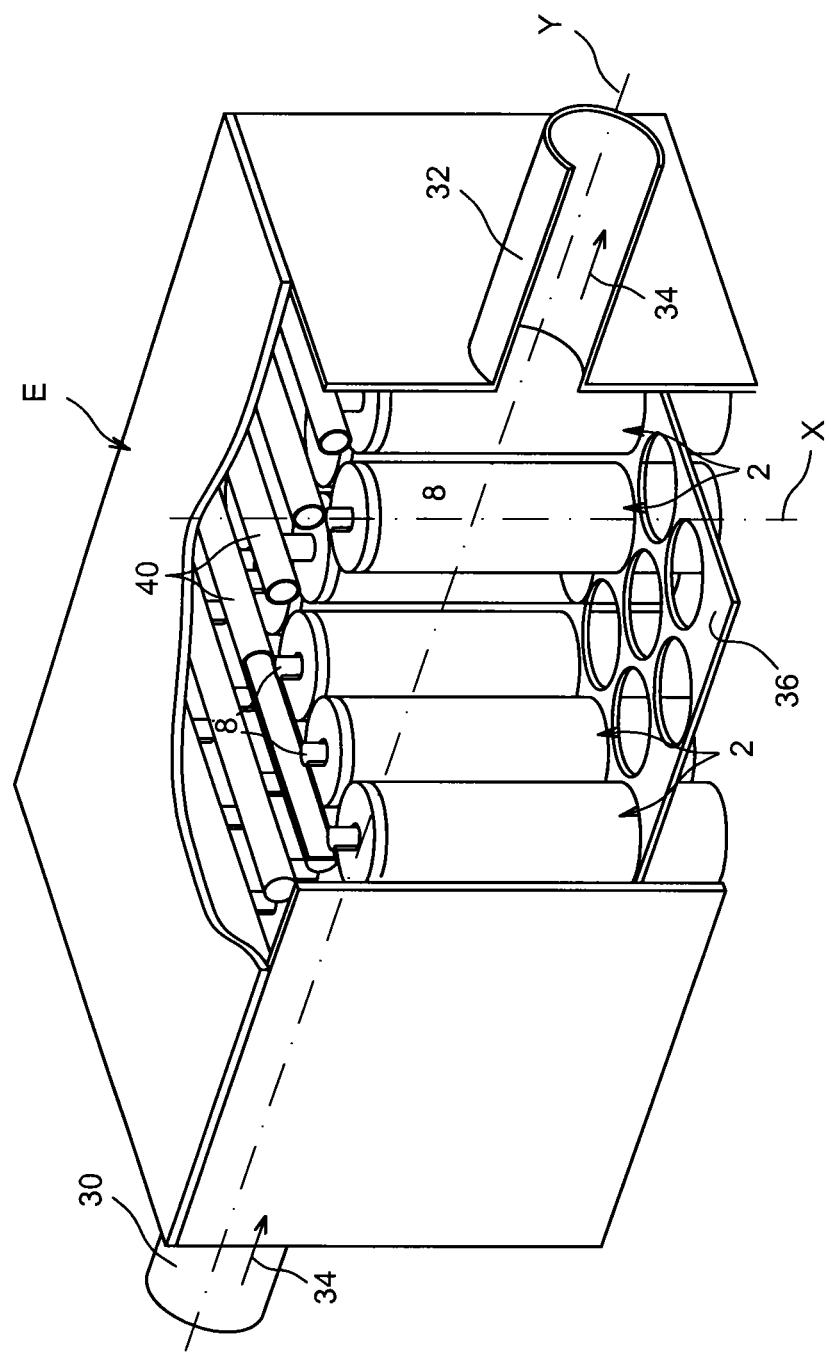
FIG. 5 is a partially cut away view of an example of embodiment of a storage device according to the invention.

An example of such a device is illustrated in FIG. 5 and will be subsequently described in detail.

Figure 1:
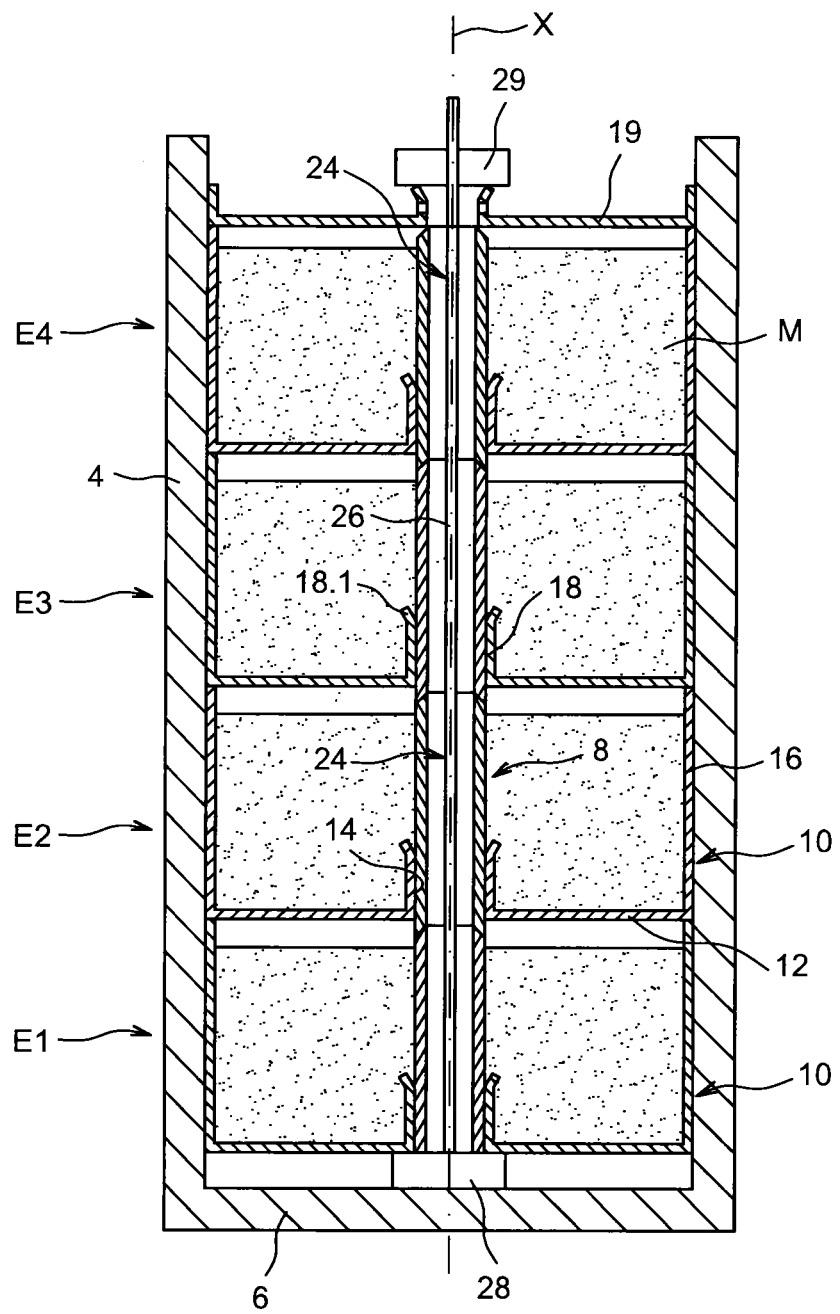
FIG. 1 is a view in longitudinal cross-section of an example of embodiment of a tank for a storage device according to the present invention illustrated diagrammatically.

An example of embodiment of a tank of storage material represented diagrammatically can be seen in FIG. 1.

The tank 2 comprises a cylindrical shell 4 along a longitudinal axis X sealed at a lower end by a floor 6. The tank also comprises an top (not illustrated) closing the upper end of the cylindrical shell.

The tank is designed to be generally oriented such that the longitudinal axis X is approximatively aligned with the direction of the gravity vector. Its orientation may however change during its use, particularly in case of onboard use.

The tank comprises means 8 of hydrogen supply and hydrogen collection formed by a duct extending along the longitudinal axis X from the floor 6 to the top.

The duct is in porous material for example, made of Poral® for instance or is perforated with through holes and is connected to a hydrogen supply and collection circuit, for example at one of its longitudinal ends; the hole size is sufficiently small to avoid passage of the powder. It is possible for example to have a duct made of porous material calibrated to a size of 1 μm in order to ensure imperviousness to the hydride powder and passage of hydrogen.

The inside of the tank is divided into several levels E1, E2, E3 and E4 along the axis X and each level comprises storage material.

The levels E1, E2, E3 and E4 are executed such as to prevent passage of the storage material in powder form from one level to another, thereby avoiding accumulation of powder at a level, particularly at the lower levels and development of pressures on the tank wall.

Each level is formed of a cup 10 installed around the duct 8. Each cup 10 comprises a base 12 approximatively perpendicular to the longitudinal axis X, provided with a central passage 14, an outer wall 16 approximatively perpendicular to the base 12 and extending over the entire periphery of the base 12 and an inner wall 18 approximatively perpendicular to the base 12 and bordering the entire passage 14. Hence, each cup 10 forms a ring-shaped tray containing storage material M.

The external diameter of the outer wall 16 of the cups is such that it allows insertion of the cups in the cylindrical shell 4, while ensuring contact with the latter to allow the storage material to exchange heat via the cups with a heat transfer fluid circulating outside the tank.

Advantageously, the width of each level is approximatively greater than its height in order to avoid stresses occurring at the bottom of the levels during charging of the storage material with hydrogen. Indeed, the volume of powder at the bottom of a level is denser and liable to apply the most stresses on the side wall. By reducing the thickness of powder, the vertical expansion of the storage material during hydrogen charging is less problematic and limits occurrence of stresses at the bottom of the level.

The dimension according to the longitudinal axis X or height of the outer wall 16 is greater than that of the inner wall 18, such that when two cups are superimposed, the base of the cup located above is solely in contact with the outer wall 16 of the cup located underneath.

The cups 10 comprise means ensuring leaktight contact between the outer wall of the cup located underneath and the base of the cup located above, employing mechanical deformation of at least one of the two cups. Hence, the cup located above forms the cover of the compartment delimited by the cup located underneath.

In the present patent application, "mechanical deformation" implies a mainly elastic deformation, which therefore involves reversible deformation of the material; removing the cup located above results in a return to its initial shape of the cup located underneath. Nevertheless, slight plastic deformation may occur without its being harmful to the seal between the cups, if this plastic deformation allows a mutual conformation of the cups ensuring geometric fault compensation.

In the example illustrated, the tank comprises four levels each having a storage material compartment. The structure of the compartments of levels E1, E2 and E3 are identical. The compartment of level E4 comprises a cup and is closed by a cover 19 of a shape similar to the base of the cups. As a variant, one might consider using a cup 10 to close the compartment of level E4; in this case, this cup would only serve as a cover and would not be filled with storage material. This variant has dimensions greater than those of the example illustrated, but offers the advantage of using only identical cups.

Each cup comprises an upper longitudinal end 22 formed by the free end of the outer wall 16 and a lower outside edge 21 formed at the connection between the outer wall 16 and the base 12.

In FIG. 2, an example of embodiment of the cups can be seen in which the cups are connected in a leaktight manner mainly by elastic deformation of the free end of the outer wall of the cup located underneath.

The upper longitudinal end 22 and the lower outside edge 22 are executed such as to allow mutual engagement of the cup located above in the cup located underneath by elastic deformation mainly of the outer wall 16 of the cup located underneath.

The cup located above bears the reference 10' and the cup located underneath bears the reference 10.

The upper longitudinal end is conformed such as to be capable of undergoing elastic deformation both radially and axially. In the example illustrated in FIG. 2, the upper longitudinal end comprises an elastically deformable area 22, consisting, starting from the free end, of a first portion A angled away from the longitudinal axis X, of a second portion B approximatively parallel to the longitudinal axis X and of a third portion C angled towards the longitudinal axis X. Seen in longitudinal cross-section, the upper longitudinal end 22 is trapezoidal in shape. The radial deformation allows geometric fault compensation and the axial deformation resolves hyperstaticity.

The cup base has a crossways section smaller in relation to the largest diameter of the first portion A of the deformable area 22 to allow it to enter the cup 10 located above, as can be seen in the detail of FIG. 2, but it is larger than the internal diameter of the cup located underneath at the level of the second portion B so as to cause elastic deformation of the deformable area 22 during its insertion. The base is connected to the outer wall 12 advantageously by a portion 23 angled away from the longitudinal axis X.

The combination of portions A, B and C of the outer wall 16 provides a degree of flexibility in adjustment, which facilitates insertion of the cup base located above 10' into the cup 10 located underneath.

During assembly of the tank, when a cup 10' located above is mounted on a cup 10 located underneath, the reduced section base is inserted into the cup 10 located underneath by exerting a force with both an axial and radial component. The radial component of the force applies the first portion A against the lower outside edge 21, deforming the latter elastically. Leaktight contact between the two cups 10, 10' is thus achieved and a compartment sealed against the powder is performed. The axial component resolves the hyperstaticity of the assembly of cups 10 and 10'.

Other variants of embodiment of this sealed contact can be seen in FIGS. 3A and 3B.

In FIG. 3A, the deformable area 122 comprises solely a first portion A and a third portion C. The upper end 122, seen in cross-section, is triangular in shape in this case.

In FIG. 3B, the deformable area 122 comprises two successive motifs, each formed by a first portion A and a third portion C.

The characteristics of the deformable area 22 of each cup (thickness, overall shape, angles and radii of curvature according to the chosen shape) are selected so as to display the anticipated elastic deformation properties.

In the example illustrated and advantageously, the free end 18.1 of the inside wall 18 is flared so as to facilitate insertion of the duct 8 in the passage.

The duct 8 may be in one piece, with the cups being force-fitted around the duct.

In the advantageous embodiment illustrated, the duct 8 is formed of several portions 8.1 to 8.4 mutually engaged in one another.

An enlarged view of one of these portions 8.1 can be seen in FIG. 4.

The longitudinal ends 8.11, 8.12 of the portion 8.1 are bevelled such that one of the ends forms a male connection and the other forms a female connection capable of interacting with male and female connections respectively of other duct portions.

Preferably, each portion 8.1 to 8.4 is force-fitted in the central passage of a cup and the subassembly thus formed is assembled with another subassembly.

The bevelled or conical shape of the ends of duct portions 8.1 to 8.4 ensures automatic centring of the subassemblies in relation to one another.

Preferably, the conical longitudinal ends of the duct portions have a vertex angle=90°−α less than or equal to 45° in order to reduce the risks of decentring.

Preferably, the vertex angle has a sufficiently high value, preferably greater than the complement at 90° of the angle of friction between the constituent materials of the duct portions 8.1 to 8.4, which ensures self-clamping of the contact by shrink-fitting.

In the example illustrated, the duct portion 8.1 is inserted into the duct portion 8.2, but a reverse arrangement does not go outside the scope of the present invention.

Other forms are conceivable for the ends of the duct portions; one may for example conceive that one end has an annular groove with a V profile and that the other end has an annular rib with a V profile corresponding to that of the V-shaped groove.

The contact between the duct 8 and the inside wall 18 of the cups is sealed against the powder.

The cups are preferably executed in a material with good thermal conductivity and capable of ensuring sufficient mechanical strength; this may for example be aluminium or copper . . . Indeed, the cups contribute to supplying heat for discharging the hydrogen stored in the hydride or for extracting heat for charging the hydrogen into the hydride.

Preferably, the duct is executed in a material displaying a thermal expansion coefficient similar to or equal to that of the material of the cups so as to reduce the risks of damage due to differential thermal expansion between the cups and the duct. It is conceivable to produce a tank in which the material of the duct displays a slightly greater thermal expansion coefficient than that of the material of the cups and this does not go outside the scope of the present invention. The dimensions of the duct and the cups are to be determined by calculation as a function of the properties of their materials such that when subjected to thermal cyclic loading, the two components retain a tight fit.

The tank also comprises means capable of exerting a longitudinal clamping force on the cups in order to keep the latter against one another and allow orientation of the tank in all directions and confirm sealed contact between the cups. It should be noted that the weight applied by the hydride contained in the cups participates in the sealed contact, more particularly in the case of the lower cups.

In the example illustrated, the clamping means 24 comprise a tie rod passing through the stack via the inside of the tube 8 and exerting a force between the cup located at the bottom of the stack and the cup located at the top of the stack. The tie rod comprises a shaft 26 arranged in the duct, a support piece 28 fixed on one longitudinal end of the shaft 26 and of sufficient dimensions in order to abut against the base of the cup located at the bottom of the pile and a clamping nut 29 screwed on to the shaft on its other longitudinal end which is threaded. The clamping nut is screwed on to the shaft after installation of the cup located at the top of the stack.

As a variant, the shaft may be replaced with a cable; in this case, a threaded shaft will be fitted solely on the top part of the cable.

The assembly of such a tank will now be described.

Prior to installing the cups, the rod 26 and the support piece 28 are installed in the cylindrical shell 4, with the support piece resting on the floor 6 of the tank.

Subassemblies formed of a cup and a duct portion are assembled beforehand. For this purpose, a duct portion 8.1 is inserted by force into the central passage of the cup 10. This tight fit ensures sealing against the powder between the duct portion 8.1 and the cup 10. Four subassemblies are manufactured in order to produce the tank illustrated in FIG. 1.

During a next stage, a first subassembly is introduced into the cylindrical shell around the shaft 26; the latter rests on the floor against the support piece 28.

The cup of the first subassembly is preferably filled before its installation at the bottom of the cylindrical shell. Filling after installation in the cylindrical shell does not however go outside the scope of the present invention.

The cup of the first subassembly is preferably filled with the storage material before its installation at the bottom of the cylindrical shell; as a variant, the cup may be filled after its installation at the bottom of the cylindrical shell. The storage material may be in powder form or in the form of one or several solid blocks; advantageously, a single ring-shaped solid block may be involved. The filling rate depends on the storage material characteristics. As a supplement to the porosity of the hydride in granular form, provision may be made for an expansion space above the storage material to take account of the swelling of the storage material during absorption.

During a next stage, the second subassembly is introduced into the cylindrical shell 4 around the shaft 26. The duct portion 8.2 interlocks in the duct portion 8.1 of the first subassembly and the cup base 10' of the second subassembly interlocks with the cup 10 of the first subassembly causing elastic deformation of the outer wall 16 and ensuring leak-tight closure of the first compartment. It should be noted that optimum deformation is obtained by tightening the nut 29 at the end of the assembly process.

The same operations are performed for levels E2 and E3.

In the case of level E4 after filling the cup, the cover 19 fits by elastic deformation within the cup closing the last compartment. The cover 19 is also equipped in its centre with a duct portion that fits within the duct portion 8.4 of the lower subassembly.

Owing to the tank structure, a rigid connection is established during assembly between the different duct portions in the centre of the tank and an elastic connection between the cups at the outer walls.

The clamping nut 29 is subsequently screwed on to the longitudinal end of the shaft 26 projecting from the stack; the nut 29 exerts pressure in this case against the inside wall of the cover bordering the duct portion. The force applied by the nut confirms the sealed contact between the cups and prevents the compartments from opening if for example the tank were to tip over. The nut features at least one passage for the hydrogen. Indeed, in this example, the duct is subsequently connected to means of hydrogen supply and collection. The passage for the hydrogen may also be realised by means of holes provided under the nut 29. The connection to the means of hydrogen supply and collection is established via the holes and/or via a central passage in the nut 29.

The radial mechanical deformation towards the exterior also possesses the advantage of improving contact between the outer walls of the cups and the cylindrical shell and thereby of improving the thermal exchanges.

The tank is subsequently closed in a gastight manner by a lid equipped with a passage for connection to the means of hydrogen supply and collection.

An example of a storage device can be seen in FIG. 5

The device comprises an enclosure E and several tanks 2 as described above arranged inside the shell 2. The enclosure is filled with a heat transfer fluid for immersion of the tanks.

In the example illustrated, the enclosure comprises a supply orifice 30 of a thermal exchange fluid and a discharge orifice 32 of said thermal exchange fluid, wherein the thermal exchange fluid passes through the enclosure from one side to the other, its circulation being symbolised by the arrows 34.

An enclosure comprising only one orifice forming supply and discharge does not go outside the scope of the present invention, said fluid flowing for example to and fro.

Preferably, the device is arranged such that the direction of circulation of the fluid is approximatively horizontal and each tank 4 has a longitudinal axis X arranged approximatively vertically, in order to be orthogonal to the direction of flow of the thermal exchange fluid.

The tanks are preferably arranged approximatively parallel in relation to each other, forming a "forest" of tanks and spaced apart from one another in order to allow the thermal exchange fluid to circulate between the tanks.

In the example illustrated, the tanks are mounted in a supporting grid 36 formed of a plate perforated by holes into which the tanks are inserted. One may also conceive of welding the tanks on to the supporting grid or of fixing the former by any other means. In the example illustrated, the supporting grid is located at a bottom portion of the tanks, but it is well understood that it could be arranged at a median portion of the tanks or hold the tanks at either of their longitudinal ends. Furthermore, several supporting grids could be used if necessary. In the example illustrated, the tanks are arranged along parallel lines, wherein the tanks of two adjacent lines are arranged in staggerd raws.

This arrangement is advantageous; since it ensures a greater circulation distance of the fluid. It is well understood however that any other arrangement could be foreseen that promotes thermal exchange between the tanks and the thermal exchange fluid.

Advantageously, the ducts 8 of the storage tubes of each line are connected in parallel to a duct 40. All the ducts 40 are connected in parallel to a general duct (not visible).

The hydrogen released or supplied is collected by the duct 8.

Release of the hydrogen can be obtained by supplying heat. Under heating, desorption of the hydrogen occurs, which circulates freely and is discharged by pressure towards the top of the cylinders. Provision could be made for pumping means if necessary.

In another example of embodiment, the storage device comprises one or several tanks, wherein each tank is surrounded by a jacket forming with the cylindrical shell of the tank a ring-shaped channel in which a heat transfer fluid circulates.

In yet another example, the storage device comprises one or several tanks, wherein the cylindrical shell of each tank is surrounded by a coiled tube in which a heat transfer fluid circulates.

Advantageously, the levels are all of the same height and are filled with approximatively the same quantity of storage material, which simplifies manufacture since identical blocks of storage material are used. A tank with levels of different heights and a non-uniform distribution of the storage material along the longitudinal axis X does not go outside the scope of the present invention and likewise a storage device comprising tanks of different size and storage capacity.

Functioning of the storage device in FIG. 5 will now be explained.

The enclosure is filled with thermal exchange fluid flooding the storage tanks; the fluid circulates in the enclosure in order to extract or contribute calories.

When one wishes to charge the storage device with hydrogen, the hydrogen is circulated in each tank via the supply tubes 8. Since the absorption reaction is exothermal, heat is released. The heat is simultaneously evacuated by circulating the thermal exchange fluid in the enclosure.

The more the heat is evacuated quickly and effective, the faster the charging rate of the device. The material charged with hydrogen subsequently forms a hydride. As already explained, the material swells due to the absorption and decrepitates, forming powder.

When one wishes to make use of the hydrogen stored in the device, the hydrogen pressure in the storage tanks is reduced or heat is provided to the hydride via the thermal exchange fluid.

The hydrogen is desorbed. The hydrogen thus released circulates from one level to another. The hydrogen circulates owing to the pressure difference between the tank and the tank outlet.

By way of an example, the storage material arranged in the compartments may be made up of one or several materials of formula $A_mB_n$, wherein A is a stable hydride such as alkaline or alkaline earth metals such as lithium, calcium or magnesium, fourth or fifth column transition metals such as zirconium or titanium, or finally rare earth metallic elements such as lanthanum, cerium and an element B forming an unstable hydride under the standard conditions of temperature and pressure, such as the majority of transition metals such as chrome, cobalt, nickel or iron.

The storage material may be a simple element hydride such as $MgH_2$.

Other materials absorbing hydrogen such as complex chemical hydrides with light elements such as alanates (NaAlH4), Li- and B-based hydrides such as LiBH4, NaBH4, . . .

The thermal exchange fluid may be a liquid such as water, oil or a gas.

The charging and discharging temperature of the tank varies for example between −20° C. and 400° C. The charging pressure varies for example between 0.1 bars and 200 bars $H_2$, and the discharging pressure varies for example between 100 bars and 0 bars (absolute). Some hydrides may require even higher charging pressures, for example 350 bars.

The structure of the tanks makes it possible to ensure a reliable leaktight closure for the thermal storage material compartments that is robust and easy to execute. Powdered storage material is no liable to accumulate in the bottom of the tank, alter functioning of the tank and possibly damage the tank. Furthermore, employment of the elastic connections makes allowance for the deformations resulting from expansion coefficients.

In addition, the elastic deformation of the cups improves the contact between the cups and the cylindrical shell and hence the thermal exchanges with the heat transfer fluid.

Moreover, the inside of the tank can be very easily disassembled; all that is needed is to remove the clamping nut.

The device according to the present invention can be used as a means of transport for hydrogen, onboard hydrogen storage for a fuel cell or internal combustion engine and for stationary hydrogen storage.

The device may therefore serve as an onboard tank for means of transport such as boats, submarines, cars, buses, trucks, construction site equipment and two-wheeled vehicles, in order to supply a fuel cell for example or an internal combustion engine. Furthermore, it may be used in the field of transportable power supplies such as batteries for portable electronic devices such as mobile telephones and laptops, . . .

The device according to the present invention may also be used as a stationary storage system for larger quantities of energy, such as generator units, for storage of hydrogen produced in larger quantities by electrolysis with electricity obtained from wind turbines, photovoltaic solar panels and geothermal energy, . . .

It is also possible to store any other source of hydrogen originating for example from hydrocarbon reforming or other processes for obtaining hydrogen (photocatalytic, biological, geological, . . . ).

The invention claimed is:

1. A hydrogen storage material tank for a device for hydrogen storage by absorption in a hydrogen storage material, comprising:
   a shell along a longitudinal axis sealed at both its longitudinal ends;
   a hydrogen supply and collection duct extending along the longitudinal axis;
   a stack of plural cups along the longitudinal axis, wherein each cup comprises a base approximatively perpendicular to the longitudinal axis, a passage allowing installation of the cup around the duct, an outer wall perpendicular to the base, in contact with the shell, and an inner wall perpendicular to the base and in contact with the duct,
   wherein the outer wall has a dimension along the longitudinal axis greater than that of the inner wall such that its free end is in contact with the base of the cup located above in the stack,
   wherein each cup is press-fitted on the duct and each cup comprises means allowing mutual engagement of the cups in one another by mechanical deformation of the free ends of the outer walls of the cups.

2. A tank according to claim 1, wherein the means allowing mutual engagement of the cups in one another by mechanical deformation includes a deformable area of the outer walls located at the free ends and having portions angled in relation to the longitudinal axis.

3. A tank according to claim 2, wherein each deformable area comprises, on the free end side of the outer wall, a portion angled away from the longitudinal axis to display a flared shape facilitating mutual engagement of the base of the cup located above in the stack and at least one portion angled towards the longitudinal axis, and wherein each base of a cup has a diameter smaller than the largest internal diameter of the outer wall of the cup.

4. A tank according to claim 1, wherein the duct is formed of plural duct portions superimposed along the longitudinal axis.

5. A tank according to claim 4, wherein each duct portion comprises on its longitudinal ends means for guiding positioning of the duct portions in relation to one another.

6. A tank according to claim 5, wherein each duct portion comprises a male connection end and a female connection end such that the duct portions are connected to one another.

7. A tank according to claim 6, wherein the male connection ends and female connection ends are conical in shape, with a vertex angle less than or equal to 45°.

8. A tank according to claim 1, wherein the cups are executed in a material with good thermal conductivity.

9. A tank according to claim 1, wherein the duct is made of porous material.

10. A tank according to claim 1, wherein the inner wall of each cup comprises a flared free end.

11. A tank according to claim 1, further comprising clamping means exerting a clamping force along the longitudinal axis between the cups located at longitudinal ends of the stack.

12. A tank according to claim 11, wherein the clamping means comprises a longitudinal element installed in the duct, a support piece abutting against a base of one of the end cups, and a clamping nut screwed on the longitudinal element and resting on the free end of the inner wall of the cup located at the other longitudinal end.

13. An assembly of a tank according to claim 1 and a hydrogen storage material arranged in each of the cups, the storage material in powder form representing between 40% and 60% of the volume of the cup.

* * * * *